United States Patent [19]

Rainville

[11] 4,364,721
[45] Dec. 21, 1982

[54] APPARATUS FOR BLOWING ORIENTED CONTAINERS

[75] Inventor: Dewey Rainville, Westfield, N.J.
[73] Assignee: Rainville Company, Inc., Middlesex, N.J.
[21] Appl. No.: 194,853
[22] Filed: Oct. 7, 1980

Related U.S. Application Data

[62] Division of Ser. No. 30,813, Apr. 17, 1979, abandoned.

[51] Int. Cl.³ ............................................. B29C 17/07
[52] U.S. Cl. ..................................... 425/149; 264/531; 425/150; 425/529; 425/533
[58] Field of Search ............... 425/149, 150, 522, 529, 425/530, 532, 533, 535; 264/529–532

[56] References Cited

U.S. PATENT DOCUMENTS

| | | | |
|---|---|---|---|
| 688,924 | 12/1901 | Blair et al. | 264/532 X |
| 3,275,726 | 9/1966 | Rudolph | 264/529 |
| 3,550,200 | 12/1970 | Gilbert | 425/529 |
| 3,757,718 | 9/1973 | Johnson | 264/531 X |
| 4,061,706 | 12/1977 | Duffield et al. | 264/556 X |

FOREIGN PATENT DOCUMENTS

| | | | |
|---|---|---|---|
| 1904753 | 8/1970 | Fed. Rep. of Germany | 264/531 |
| 2610259 | 8/1977 | Fed. Rep. of Germany | 425/533 |
| 2705775 | 8/1978 | Fed. Rep. of Germany | 264/530 |

*Primary Examiner*—Jan H. Silbaugh
*Attorney, Agent, or Firm*—Hopgood, Calimafde, Kalil, Blaustein & Judlowe

[57] ABSTRACT

This specification discloses an improved apparatus and method for making bi-axially oriented containers in an injection blow molding machine. The parison is brought to the blow mold at orientation temperature, and the end of a reciprocating element is brought into contact with the end of the parison and is shaped to prevent the end of the parison from shifting off center as the parison is blown and stretched axially while it expands circumferentially to obtain bi-axial orientation. The reciprocating element prevents the parison from shifting laterally in the blowing mold so that the stretching and the wall thickness of the blown article is uniform.

12 Claims, 8 Drawing Figures

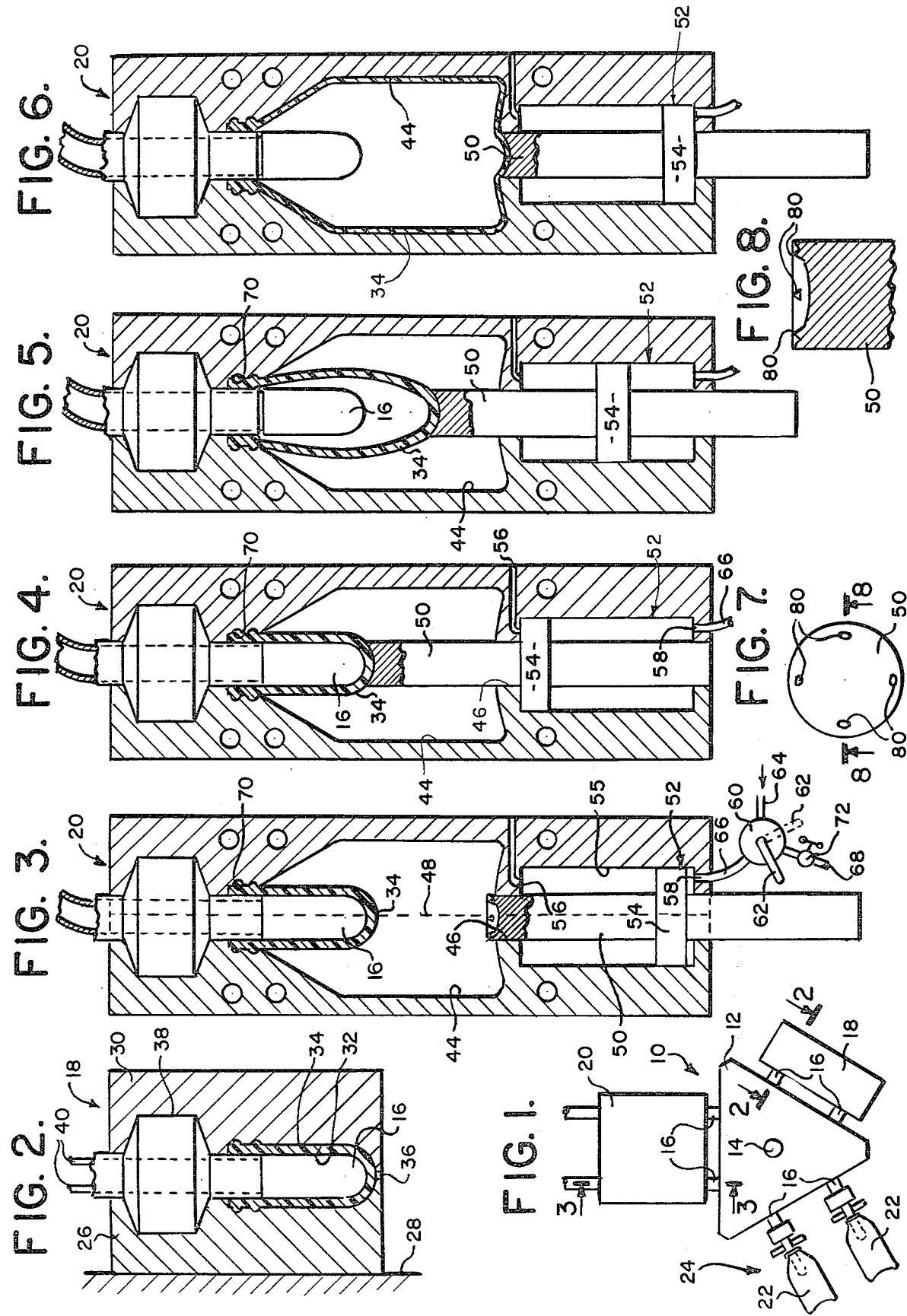

APPARATUS FOR BLOWING ORIENTED CONTAINERS

This is a continuation of application Ser. No. 30,813 filed Apr. 17, 1979 now abandoned.

BACKGROUND AND SUMMARY OF THE INVENTION

One of the practical limitations on stretching a parison in a blowing mold for bi-axial orientation is that parts of the wall of the parison may be at somewhat different temperatures so that the parison wall stretches more on one side than the other and shifts to one side of the blow mold cavity so as to contact the cool wall of the cavity on one side before the parison can be stretched uniformly.

This invention has a restraining element in axial alignment with the core rod and the reciprocating element has an end face that is brought into contact with the parison, preferably before the blowing of the parison begins. As the parison is blown, the end face of the reciprocating element remains in at least a light contact with the parison and holds it on the center line of the blowing mold, while the end of the reciprocating element is held against the parison by a piston force produced by air pressure on the piston, the piston force being slightly less than the force produced by the pressure of the blowing air within the parison.

The surface of the reciprocating element that contacts with the end of the parison during the blowing operation controls the shape of the center portion of the bottom of the container that is formed in the mold cavity.

In the preferred embodiment of the invention, the parison is maintained at or above orientation temperature while on the core rod by circulating temperature-controlling fluid through the core rod.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is a top plan view constituting a diagrammatic showing of an injection blow molding machine made in accordance with this invention;

FIG. 2 is an enlarged sectional view taken on the line 2—2 of FIG. 1;

FIG. 3 is a greatly enlarged sectional view taken on the line 3—3 of FIG. 1;

FIGS. 4-6 are views similar to FIG. 3, but showing successive steps in the operation of blowing an oriented container in the blowing mold, shown in FIG. 3;

FIG. 7 is a top plan view, on an enlarged scale, of the top face of the reciprocating element that contacts with the parison in FIGS. 3-6; and FIG. 8 is a sectional view taken on the line 8—8 of FIG. 7.

DESCRIPTION OF PREFERRED EMBODIMENT

FIG. 1 shows an injection blow molding machine 10 which has a generally triangular table 12 that rotates about a center post 14 and that has core rods 16 extending from the angularly related faces of the table 12. Two core rods 16 extend from each face of the generally triangular head 12 but more or fewer core rods can extend from each face of the head 12, depending upon the size of the head and the size of the articles that are to be blown.

Molten parisons are applied to each of the core rods in an injection mold 18 in accordance with conventional practice.

Upon completion of the injection operation, the mold 18 opens and the post 14 moves axially to lift the core rods 16 clear of the stationary portion of the mold 18 so that the head 12 can rotate through an angle of 120° to bring the core rods 16 into line with the cavities of a blowing mold 20 at the blow station of the machine 10. The blowing mold 20 is novel and will be described in detail in connection with other figures of the drawing. After the blowing operation, the head 12 again moves to shift the core rods through an angle of 120° about the axis of the post 14 so that containers 22 can be shifted from the blowing station of the mold 20 to a third station 24 at which the containers 22 are stripped from the cone rods 16. This stripper station 24 can be of conventional construction.

FIG. 2 shows the injection mold 18 with a fixed mold section 26 secured to a base 28 of the blow molding machine. A movable mold section 30 cooperates with the fixed section 26 to form a cavity 32 when the mold 18 is closed. The core rod 16 extends into the cavity 32 with clearance between the chamber 32 and the core rod 16. Molten plastic, to form the parison 34 is injected into the cavity or chamber 32 through an opening 36 from the nozzle of a plasticizer in accordance with conventional practice.

The core rod 16 has a locating shell secured to it just beyond the injection cavity 32 for more accurate positioning of the core rod 16 in the mold and resulting uniformity in the clearance between the core rod 16 and the wall of the mold cavity 32 around the entire axis of the core rod.

The parison 34 is preferably injected into the mold cavity 32 at or above the orientation temperature of the plastic used for the parison. The temperature of the parison is controlled by circulating heat controlling fluid through pipes 40, one of which supplies the heat-controlling fluid and the other which provides an exhaust for the fluid back to the source of temperature control. The heat control applies preferably to both the core rod 16 and the locating shell 38. This temperature control for the parison 34 is preferably maintained during transfer from the injection mold to the blowing mold and during the blowing of the parison in the blowing mold cavity.

FIG. 3 shows the core rod 16, with the parison 34 on it, and the locating shell 38 transferred to the blowing mold 20. The neck of the parison is confined in the upper portion of a cavity or chamber 44 of the blow mold. And the parison 34 extends downward into the chamber, as shown in FIG. 3.

Control of the temperature of the parison is important in order to obtain bi-axial orientation by stretching the parison both lengthwise and circumferentially while the material of the parison is within the orientation range for the particular plastic or mixture of plastics of which the parison is made. Some compositions have quite a narrow range of orientation temperature. In order to control the blowing of the parison for bi-axial orientation, it is important to hold the parison centered in the blow mold cavity 44. In order to maintain uniform stretching of the parison, it is essential that the parison not move sideways in the blow mold during the blowing operation to the extent that any portion of the parison comes in contact with the wall of the blow mold cavity. It is a universal practice in blow molding machines to keep the walls of the blow mold cool, so that once the parison has been fully blown, the plastic cools quickly and hardens the plastic so that the blown article can be removed from the blow mold as soon as possible after the blowing operation is completed. The production capacity of a blow molding machine depends upon how quickly the blown articles become hard enough to be discharged from the blow mold cavity without distortion.

Whereas FIG. 3 shows piston 54 operating in cylinder bore 55 as part of blow mold 20, it is conceivable and desirable for rigid materials that this could be a separate section including most of the bottom section of the blow cavity 44, and that it have retractable means, such as cam action or an additional fluid motor action in order to allow blow mold opening without damage to the blown container.

There is a cylindrical opening 46 through the bottom of the blow mold cavity 44 and at the center of the bottom of the cavity. The axis of the opening 46 is in line with the axis of the core rod 16, as indicated by the line 48. A reciprocating element 50 comprises a piston rod which is a sliding fit in the opening 46 and with clearance small enough to prevent the escape of any plastic material of the parison into the opening 46 during the blowing operation.

A cylinder and piston motor, indicated generally by the reference character 52, is located below the blow mold cavity and the cylinder 55 is in alignment with the blowing mold cavity; the cylinder axis being along the line 48 in FIG. 3 of the preferred construction. A piston 54 is secured to the rod 50 and moves up and down in the cylinder 55 as a unit with the piston rod 50.

When the piston 54 is at the end of its stroke, as shown in FIG. 3, the end of the rod 50 is flush with the bottom wall of the blowing mold cavity 44.

In order to operate the cylinder and piston motor 52, there are ports 56 and 58 at opposite ends of the cylinder 55. Working fluid, preferably compressed air, flows into and out of these ports 56 and 58 so as to make the motor a double-acting motor.

FIG. 3 shows the positions of the parts when the blow mold 20 completes its closing operation. A simple control for the port 58 will be described, but it will be understood that the valve mechanism is merely representative of valves for controlling the flow of working fluid in accordance with the desired sequence of operation. A three-way valve 60 (FIG. 3) has a handle 62 which moves into different angular positions, one of which is shown in dotted lines. When the handle 62 is in the full line position, working fluid from a supply pipe 64 flows through the valve 60 and through a tube 66 to the inlet port 58. The port 56 is open to exhaust and the piston 54 moves up rapidly into contact with the confronting face at the bottom of the parison 34. This is the upper limit of the stroke of the motor 52. (FIG. 4).

When the blowing operation is started, the handle 62 (FIG. 3) of the valve 60 is moved into its dotted line position. This closes the working fluid supply line 64 and opens an exhaust line 68 which permits working fluid under the piston 54 to escape into the ambient atmosphere.

As soon as the blowing operation starts, the air pressure introduced into the interior of the parison 34 from the core rod 16 expands the parison away from the core rod 16, as shown in FIG. 5, except at the upper end of the parison where it is confined in a neck portion 70 of the blowing mold 20. The pressure of the air inside the parison 34 pushes the piston rod 50 downward, and the escape of working fluid from under the piston 54 is coordinated with the air pressure introduced into the parison from the core rod so that the rate at which the piston rod 50 moves downward offers just enough resistance to maintain the upper end face of the rod 50 in contact with the parison. One way in which this can be accomplished, is by use of a bleed valve 72 (FIG. 3) in the exhaust line 68, so that adjustment of the valve 72 permits escape of air from under the piston 54 at a rate which maintains the upper end of the piston 50 in contact with the lower end of the parison 34, as shown in FIG. 5.

The valve 60 is merely representative of valve means for introducing working fluid under the piston 54 to move the reciprocating element, which constitutes the piston rod 50, into contact with the parison prior to blowing; and to cause the piston to move downward as the parison is blown and to maintain contact with the parison to keep it centralized in the blow mold cavity.

In a more sophisticated control, the degree of opening of the bleed valve 72 would be controlled by the pressure of the blowing air which is introduced into the parison to expand it in the blow mold in accordance with the step shown in FIG. 5.

FIG. 6 shows the parison fully blown to the shape of the blowing mold cavity and shows the piston rod 50 at the lower limit of its travel and flush with the bottom wall of the blowing mold cavity.

As previously explained, the principal function of the reciprocating element 50, which constitutes the piston rod of the motor 52 in the illustrated embodiment, is to prevent the parison 34 from moving transversely of its length as it expands in the blowing mold cavity. This means that the element 50 must be capable of exerting some restraint on the blowing parison as the parison increases in size. Such restraint can be obtained in three different ways.

As long as the upper face of the element 50 is in contact with the end of the parison 34, friction between the contacting surfaces of the element 50 and parison 34 provides some restraint against relative movement.

In order to have more restraint, it is preferable to have the upper end of the element 50 made with a concave surface so that the curved lower end of the expanding parison fits down into the concave face at the upper end of the element 50. As long as this relationship can be obtained, there is substantial restraint against any lateral movement of the lower end of the parison with respect to the vertical axis 48 (FIG. 3) of the blowing mold cavity and the depressed upper end of the element 50.

Still greater resistance to relative lateral movement of the parison and the top face of the element 50 can be obtained by using the construction shown in FIGS. 7 and 8. In the construction illustrated, there are projections 80 extending up from the top surface of the element 50. These projections are preferably pointed so that they form small depressions in the outside surface of the lower end of the parison; but the projections 80 are not long enough to extend through the bottom wall of the parison or far enough into the parison to cause a structural weakness of the bottom of the container. Actually, the portion of the fully blown parison, which is in contact with the upper face of the element 50 during the blowing operation, is somewhat thicker than the walls of the container at other regions which expand during the blowing operation without being in contact with any other structure. This can be used to compensate for the extent to which the projections 80 extend into the bottom wall of the container which is blown in the blowing mold cavity. The original contact of the upper end of the element 50 with the parison, before blowing, as shown in FIG. 4, can be used to supply the force to initially embed the projections 80 into the plastic of the confronting area of the parison.

Since it is not possible to have molten plastic parisons of absolutely the same strength throughout their entire extent, the parison, when blown extensively, tends to expand more on its weaker side than elsewhere. This invention makes it possible to blow satisfactory containers in a blow mold cavity which is very much longer than the parison with the result that the axial stretching can be increased between 25 and 200%. Conventional bi-axial orientation obtains much greater circumferential stretching than it does axial stretching, and this invention greatly increases the strength of a container against both tension and impact, and also resistance to permeation by fluids.

The preferred embodiment of the invention has been illustrated and described, but changes and modifications can be made and some features can be used in different combinations without departing from the invention as defined in the claims.

What is claimed is:

1. Apparatus for blowing plastic containers and bottles or the like including a parison-forming injection mold including a core rod around one end length of which a parison is molded, a blow mold to which the core rod and its parison are shifted from the injection mold, said blow mold including means forming a blow-mold cavity in substantial alignment with the core rod, a substantially solid piston rod that slides longitudinally in a guide at the end of the cavity opposite the core rod and in alignment with the core rod, an end portion of the piston rod that confronts and contacts with the end of the parison when the piston rod is advanced to its limit of movement toward the end of the parison and core rod, means for retracting the piston rod away from the core rod as the parison moves away from the end of the core rod at the start of a blowing operation in the blow mold, the end portion of the piston rod having a substantially continuous concave surface into which the confronting end of the parison extends to hold the confronting end portion of the parison against lateral movement with respect to the longitudinal axis of the core rod and the piston rod during the blowing of the parison to the shape of the cavity of the blow mold, means for stopping the travel of the piston rod when the end portion of the piston rod reaches a position where it cooperates with an annular bottom of the blow mold that surrounds said piston rod in the end of the cavity remote from the core rod so that the bottom of the blow mold and the concave end surface of the piston rod provide a support for the entire area of the bottom of a fully blown container in the mold, said concave end surface of the piston rod having projections that extend into the bottom surface of the parison to prevent lateral movement of the parison with respect to the concave end surface of the piston rod, said projections extending beyond the concave end surface of the piston rod for a distance less than the thickness of the blown parison.

2. The apparatus described in claim 1 characterized by a cylinder and piston motor at the end of the blow mold remote from the core rod, the axial length of the cylinder being at least as great as the length of the piston that slides therein plus the distance between the end of the parison when it contacts with the end of the core rod and the end of the blow mold cavity that is remote from the end of the core rod.

3. The apparatus described in claim 2 characterized by walls at both ends of the cylinder, one of the walls constituting a part of the end of the blow mold that is remote from the core rod.

4. The apparatus described in claim 3 characterized by a passage through the cylinder wall remote from the blow mold for escape of fluid in the cylinder on the side remote from the blow cavity, and means for controlling the escape of working fluid from the cylinder at a rate coordinated with the pressure at which fluid is supplied to the inside of the parison so that the escape of fluid from the cylinder on the side of the piston remote from the parison maintains the reciprocating element in contact with the parison during the blowing of the parison in the blow mold.

5. The apparatus described in claim 3 characterized by a passage through the cylinder wall remote from the blow mold for introducing fluid into the cylinder on the side of the piston remote from the blow mold to move the piston rod into position to bring the end surface thereof into contact with the portion of the parison that covers the end of the core rod.

6. The apparatus described in claim 1 characterized by the end of the blow mold cavity remote from the parison being shaped to form a bottom of the container being blown in the mold cavity and being shaped to mold the bottom surface of the container with the peripheral portion of the bottom lower than a center portion of the container bottom.

7. The apparatus described in claim 1 characterized by means for circulating temperature-controlling fluid through the core rod for maintaining plastic that forms the parison in a temperature range for obtaining bi-axial orientation of the plastic of the parison during longitudinal and circumferential stretching of the plastic of the parison.

8. The apparatus described in claim 1 characterized by the blow mold being formed of a plurality of sections that fit together to form the blow mold cavity and that separate from one another to provide clearance for removing a container blown in said mold, and a portion of the core rod beyond the parison and the blow mold cavity for holding the core rod in place during the blowing of the parison in the blow mold.

9. The apparatus described in claim 8 characterized by a supporting shell rigidly secured to the core rod and of substantially larger cross-section than the parison and fitting into depressions in the mold sections for holding the core rod rigidly in place with the parison on the core rod located in the blow mold cavity.

10. Apparatus for blowing plastic containers and bottles or the like including a parison-forming injection mold including a core rod around one end length of which a parison is molded, a blow mold to which the core rod and its parison are shifted from the injection mold, said blow mold including means forming a blow-mold cavity in substantial alignment with the core rod, a substantially solid piston rod that slides longitudinally in a guide at the end of the cavity opposite the core rod and in alignment with the core rod, said piston rod having an end portion with a concave end surface that confronts and contacts with the end of the parison when the piston rod is advanced to its limit of movement toward the end of the parison and core rod, means for retracting the piston rod away from the core rod as the parison moves away from the end of the core rod at the start of a blowing operation in blow mold, the end of the blow mold cavity remote from the parison being shaped to form a bottom of the container being blown in the mold cavity and being shaped to mold the bottom surface of the container with the peripheral portion of the bottom lower than a center portion of the container bottom, the end portion of said piston rod being characterized by a plurality of projections in angularly spaced array and with sharp upper ends that pierce the bottom surface of the parison at locations lower than the periphery of said concave end surface but higher than the peripheral portion of the lower end of the blow mold cavity.

11. The apparatus described in claim 10 characterized by said projections being shorter than the thickness of the parison on the core rod so that the projections cannot pierce holes through the bottom of the container but effectively prevent lateral movement of the parison with respect to the reciprocating element during blowing of the parison to fill the blow mold cavity.

12. Apparatus for blowing plastic containers and bottles or the like including a parison-forming injection mold including a core rod around one end length of which a parison is molded, a blow mold to which the core rod and its parison are shifted from the injection mold, said blow mold including means forming a blow-mold cavity in substantial alignment with the core rod, a substantially solid piston rod that slides longitudinally in a guide at the end of the cavity opposite the core rod and in alignment with the core rod, an end portion of the piston rod that confronts and contacts with the end of the parison when the piston rod is advanced to its limit of movement toward the end of the parison and core rod, means for retracting the piston rod away from the core rod as the parison moves away from the end of the core rod at the start of a blowing operation in the blow mold, and projections on said end portion that indent the surface of the parison to prevent lateral movement of the parison with respect to the reciprocating element during axial movement of the parison and of the end portion in contact with one another during the blowing of the parison in the blow mold.

* * * * *